US009161111B2

(12) United States Patent
Yuan et al.

(10) Patent No.: US 9,161,111 B2
(45) Date of Patent: Oct. 13, 2015

(54) WIRELESS SPEAKER AND WIRELESS SPEAKER SYSTEM THEREOF

(71) Applicants: Xiaotao Yuan, Guangdong (CN); Qian Zhang, Guangdong (CN); Hongyan Lu, Guangdong (CN)

(72) Inventors: Xiaotao Yuan, Guangdong (CN); Qian Zhang, Guangdong (CN); Hongyan Lu, Guangdong (CN)

(73) Assignee: SHENZHEN 3NOD ELECTRONICS CO., LTD., Shenzhen, Guangdong (CN)

( * ) Notice: Subject to any disclaimer, the term of this patent is extended or adjusted under 35 U.S.C. 154(b) by 239 days.

(21) Appl. No.: 13/645,323

(22) Filed: Oct. 4, 2012

(65) Prior Publication Data

US 2013/0272535 A1 Oct. 17, 2013

Related U.S. Application Data

(63) Continuation of application No. PCT/CN2012/074068, filed on Apr. 16, 2012.

(30) Foreign Application Priority Data

Dec. 22, 2011 (CN) .......................... 2011 1 0435600

(51) Int. Cl.
*H04B 3/00* (2006.01)
*H04R 1/02* (2006.01)
*F21V 33/00* (2006.01)

(52) U.S. Cl.
CPC ............ *H04R 1/023* (2013.01); *F21V 33/0056* (2013.01); *H04R 1/026* (2013.01); *F21V 33/0052* (2013.01); *H04R 2201/021* (2013.01); *H04R 2420/07* (2013.01)

(58) Field of Classification Search
CPC .... H04R 1/02; H04R 1/023; H04R 2201/021; H04R 33/9453; F21V 33/0056; F21V 33/0052; G08C 17/02; F21K 9/135
USPC .............. 381/77, 386; 362/86, 386, 362, 378, 362/103, 383
See application file for complete search history.

(56) References Cited

U.S. PATENT DOCUMENTS 5,980,057 A * 11/1999 Christie .......................... 362/86
6,812,970 B1 * 11/2004 McBride ....................... 348/372

(Continued)

FOREIGN PATENT DOCUMENTS

CN 201697092 U 1/2011
CN 201742515 U 2/2011

(Continued)

*Primary Examiner* — Davetta W Goins
*Assistant Examiner* — Oyesola C Ojo
(74) *Attorney, Agent, or Firm* — Tim Tingkang Xia; Locke Lord LLP

(57) ABSTRACT

Disclosed is a wireless speaker having a structure with the outer cover. The outer cover can be easily detached from the speaker body, facilitating user's mounting external electronic products as desired, for example, various types of bulbs, such as an LED or energy-saving lamp, and a wireless router or a camera. Also disclosed is a wireless speaker system, where the wireless set and the wireless speaker use wireless transmitting and receiving modules, or may use WiFi, Bluetooth or other wireless transmission modes. The wireless set supports a plurality of wireless speakers, and the wireless receiving speaker may be mounted on the ceiling, wall, or hidden place in a kitchen, living room, bedroom, bathroom or even bar, and restaurant; or even mounted on a table or floor lamp, or transportation means such as trains and planes, serving as a video and audio center for households and entertainment places by free combinations.

20 Claims, 4 Drawing Sheets

(56) References Cited

U.S. PATENT DOCUMENTS

| | | | | |
|---|---|---|---|---|
| 7,606,379 | B2 * | 10/2009 | Ivey et al. | 381/160 |
| 8,588,431 | B2 * | 11/2013 | Aggarwal et al. | 381/58 |
| 2006/0039570 | A1 | 2/2006 | Yeh | |
| 2008/0212971 | A1 * | 9/2008 | Shaanan et al. | 398/130 |
| 2008/0246844 | A1 * | 10/2008 | Chan | 348/152 |

FOREIGN PATENT DOCUMENTS

| | | | | |
|---|---|---|---|---|
| CN | 201886277 | U | 6/2011 | |
| KR | 20020024111 | * | 3/2002 | H04R 1/028 |

* cited by examiner

WIRELESS SPEAKER AND WIRELESS SPEAKER SYSTEM THEREOF

CROSS-REFERENCE TO RELATED APPLICATIONS

This application is a continuation of International Patent Application No. PCT/CN2012/074068, with an international filing date of Apr. 16, 2012, designating the United States, now pending, which is based on Chinese Patent Application No. 201110435600.7, filed Dec. 22, 2011. The contents of these specifications are incorporated herein by reference.

BACKGROUND OF THE INVENTION

1. Field of the Invention

The present invention relates to a wireless speaker and a wireless speaker system thereof.

2. Description of the Related Art

Nowadays, speakers play an important role in people's entertainments. Currently, various types of speakers are arranged in the nightclub, café, dancing hall, advanced hotel, and household. These speakers are arranged at different places to create a stereo effect, allowing users to enjoy beautiful music. In some of the above environments, besides the speaker, the light and camera may also be arranged and the wireless router may be used. Generally, during decoration, the merchant separately arranges the speaker, the light, the camera, the wireless router.

In the apparatus disclosed in U.S. Pat. No. 6,748,096, the bulb and the speaker are arranged parallelly. This traditional method increases the cost and wastes space, and meanwhile the speaker and the light cannot be synchronously controlled, thereby failing to achieve the optimal environment effect.

To achieve synchronous control of the speaker and the illumination, the apparatus integrating the speaker and the illustration device is provided. For example, patent No. ZL20070064623.0 discloses a ceiling luminarie with a speaker, where the speaker is internally provided with a loudspeaker, and the luminarie and speaker are fixedly connected. However, this apparatus simply integrates the functions of the speaker and the illumination, failing to implement remote operations. In practice, the apparatus is mounted at a high place or at other unreachable places, increasing the complexity of the operations and requiring deployment of wired connection of multiple lines.

To improve convenience of the operation and control, a wirelessly connected speaker is currently provided. For example, U.S. Pat. No. 5,980,057 discloses a wireless module. However, this wireless module is operable to receive FM signals, rather than receiving audio signals.

Patent No. ZL200920302182.2 discloses a plane artist speaker having LED illumination, including the LED illumination and 2.4 GHz wireless receiving functions. In addition, an SD card interface and a standard USB data interface are provided for signal transmission of a USB disk and laptop. This artist speaker not only provides the wireless receiving function but also provides the function of data transmission through an interface. In practice, the user would not carry the laptop along. In this case, when the user uses a USB disk, the desired data needs to be transmitted to the USB disk first. This increases the usage complexity and additionally the migratability is not high.

With the rapid development of the electronic products, more and more electronic products are deployed in the room.

However, in such deployment mode, more space in the room is occupied, and uniform control cannot be implemented.

SUMMARY OF THE INVENTION

To overcome the defect of the related product currently used, the present invention provides a new wireless speaker system, which is capable of implementing remote control, provides strong anti-interference capabilities and is convenient to apply and mount.

The technical solution disclosed in the present invention to address the technical problem is implemented as follows:

The present invention provides a wireless speaker, including an outer main body and an inner structure, where the outer main body includes a bottom cover with a front-end opening, where the rear end of the bottom cover is provided with a universal standard screw holder, and the front end of the bottom cover is provided with a detachable outer cover; the inner structure includes a power supply circuit, a wireless receiving apparatus, a control panel, a speaker apparatus, and a detachable external electronic element, where the power supply circuit supplies power to the internal structure, the radio receiving apparatus is operable to receive wireless audio digital signals and transmit the received signals after digital-to-analog conversion on the control panel to the external electronic element and the speaker apparatus, the speaker apparatus is fixed in the bottom cover, the bottom cover is provided with an inner mounting sleeve, and the external electronic element is detachably mounted in the inner mounting sleeve and electrically connected to the power supply circuit and the control panel.

Preferably, the universal standard screw holder arranged at the rear end of the bottom cover is formed of a metal screw cap and a metal press stub; the front-end opening of the bottom cover is provided with a face cover; the inner mounting sleeve is fixed on the face cover; the speaker apparatus includes a loudspeaker; and the face cover is provided with an opening through which the sound from the loudspeaker is transmitted.

Preferably, the speaker apparatus further includes a loudspeaker net mounted on the outer side of the face cover, the loudspeaker net is provided with a through hole arranged correspondingly to the inner mounting sleeve of the face cover, and the external electronic element is mounted in the inner mounting sleeve of the face cover through the through hole.

Preferably, the external electronic element is provided with a universal standard screw holder formed of a metal screw cap and a metal press stub, and the interior of the inner mounting sleeve is provided with a mounting bracket cooperating with and electrically connected to the standard screw holder of the external electronic element.

Preferably, the external electronic element is a light source, and at least one portion of the light emitting part of the light source projects from the outer side of the face cover.

Preferably, the light source is an LED lamp or an energy-saving lamp.

Preferably, the external electronic element is a wireless router or a camera or a projector, where the wireless router or the camera or the projector is electrically mounted in the mounting bracket of the inner mounting sleeve through an outer housing having a standard screw holder.

Preferably, the control panel includes a processor, a sound control module, and an external electronic element control module; where the external electronic element is connected to the external electronic element control module, the speaker apparatus is connected to the sound control module, and the processor and the sound control module are respectively connected to the external electronic element control module to control corresponding modules to work.

Preferably, the wireless receiving speaker further includes a built-in apparatus, where the built-in apparatus includes a light source or a wireless router or a camera, or a projector or any combination thereof, and the control panel further includes a built-in apparatus control module, operable to control the built-in apparatus.

The present invention also provides a wireless speaker system, including the wireless speaker described above. The system further includes:

a wireless transmitting set, operable to obtain audio data from an external electronic device, and transmit the audio data in the form of wireless audio digital signals; where the wireless transmitting set includes a set body, a wireless transmitting module set in the set body, and a PCBA control board for controlling the wireless transmitting module.

Preferably, the set body includes a plastic upper cover and a lower plastic cover that are mutually contacted; where the plastic upper cover is provided with a support bracket for housing an audio playing device, and the lower plastic cover is externally provided with a light transmission element for remote control of reception.

Preferably, the wireless speaker system further includes a remote controller collaborated with the wireless transmitting set.

Compared with the prior art, the present invention has the following advantages:

1. The present invention adopts an overall speaker structure with the outer cover. The outer cover can be easily detached from the bottom cover of the speaker body, thereby facilitating user's mounting types of external electronic products as desired, for example, various types of bulbs, such as an LED lamp or an energy-saving lamp, and a wireless router or a camera. This facilitates user's selections, belonging to modularized and structuralized overall design.

2. The intelligent control panel is designed. The control panel has an internal microcomputer control system capable of controlling the electronic elements such as a light source or a wireless router or a camera, and the speaker system to work, so that working of the speaker, control of the flash, or working of the wireless router or camera are implemented using the modularized design. The design of integrating the electronic product in the speaker achieves synchronization of multiple functions, reduces the occupied space, and saves costs, which is applicable to various environments such as office, home, café, bar, even plane and train.

3. The speaker system according to the present invention has a wireless transmitting set and a wireless receiving speaker. The wireless transmitting set is operable to receive audio signals and transmit the received signals to the wireless receiving speaker by using a wireless system. Using the long-distance remote controller, a user does not need to move his body to switch the switches of electronic elements such as the speaker, light, camera, projector, and wireless router.

4. The speaker is connected to an external solar panel, effectively using the clean solar energy and achieving environment protection and energy saving.

DETAILED DESCRIPTION OF THE EMBODIMENTS

To make persons of ordinary skills in the art better understand and implement the technical solution of the present invention, the following section further describes the present invention with reference to accompanying drawings and exemplary embodiments.

Figure 1:
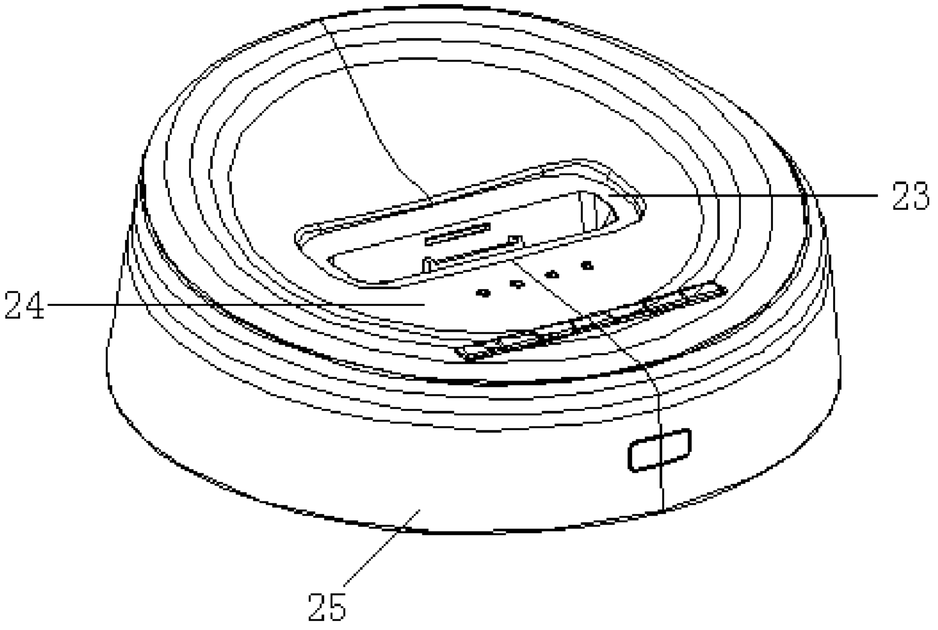
FIG. 1 is a schematic diagram of a wireless transmitting set.
Figure 2:
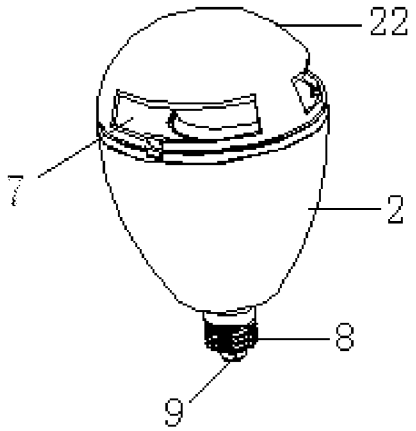
FIG. 2 is a schematic diagram of a wireless receiving speaker.

The wireless speaker system as shown in FIGS. 1 and 2 includes two parts, a wireless transmitting set and a wireless receiving speaker. The wireless transmitting set is connected to an external electronic device. The external electronic device includes an MP3, an iPod/iPhone, and a laptop, and concurrently supports AUX IN input and USB/SD card audio input, for obtaining audio data, and transmits wireless audio digital signals to the wireless receiving speaker through an internal wireless transmitting module for controlling the wireless receiving speaker to play audio data.

The system includes at least one wireless receiving speaker. The wireless receiving speaker is formed by an outer body and an inner structure. The inner structure includes a power supply circuit, a wireless receiving apparatus, a control panel, a speaker apparatus, and a detachable external electronic element 26 (refer to FIG. 4B). The power supply circuit supplies power to the inner structure, the wireless receiving apparatus is operable to receive wireless audio digital signals transmitted by the wireless transmitting set, and transmit the received signals after digital to analog conversion to the external electronic element 26 and the speaker apparatus.

The control panel includes a processor, a sound control module, and an external electronic element control module; where the external electronic element is connected to the external electronic element control module, the speaker apparatus is connected to the sound control module, and the processor and the sound control module are respectively connected to a light control module to control corresponding modules to work.

FIG. 2 is an overall schematic diagram of a wireless receiving speaker. The outer body of the wireless receiving speaker includes a bottom cover 2 having an opening, a metal screw cap 8 and a metal press stub 9 fixed at the rear end of the bottom cover 2 and connected by turns, and a face cover 1 (refer to FIG. 3) arranged on the end with the opening of the bottom cover 2, a loudspeaker net 7, and a detachable outer cover 22. The metal screw cap 8 and the metal pressure stub 9 form a universal standard screw holder.

Figure 3:
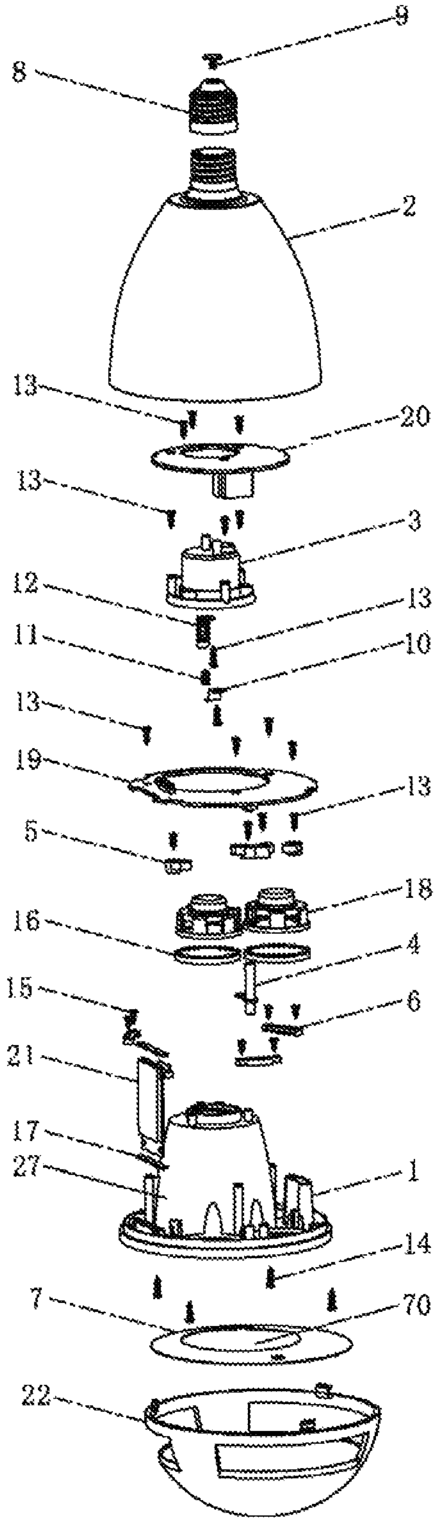
FIG. 3 is a decomposition schematic diagram of a wireless receiving speaker.

Referring to FIG. 3, the speaker apparatus is fixed on the face cover 1, and the external electronic element 26 is mounted in an inner mounting sleeve 27 of the face cover 1. The power supply circuit is a PCB 20 arranged in the bottom cover 2, and the control panel is a primary PCB 19 arranged in the bottom cover 2.

The speaker apparatus is comprised of a loudspeaker 18, a loudspeaker press board 5, and a loudspeaker net 7. The loudspeaker 18 is fixed through the loudspeaker press board 5 on the face cover 1. The face cover 1 is provided with an opening for housing the loudspeaker 18 and transmitting the sound generated by the loudspeaker 18. The loudspeaker net 7 is mounted on the outer side of the face cover 1, and is provided with a through hole 70 arranged correspondingly to the inner mounting sleeve 27 of the face cover 1. The through hole 70 has a diameter larger than the diameter of the inner mounting sleeve 27 of the face cover 1, and is operable to mount the external electronic element 26 in the inner mounting sleeve 27 of the face cover 1. The external electronic element is provided with a universal standard screw holder. The inner mounting sleeve 27 is internally provided with a mounting bracket (not shown) collaborating and electrically connected to the standard screw holder of the electronic element, so that the external electronic element is electrically connected to the power supply circuit and the control panel.

In the embodiments of the present invention, the external electronic element 26 may be a light source, a camera, a wireless router, or a projector.

The following uses the light source as an example for detailed description of the embodiments of the present invention.

Figure 4A:
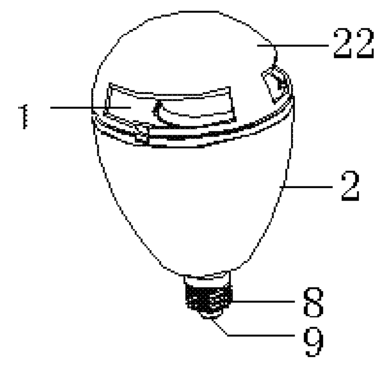
FIGS. 4A and 4B are schematic diagrams of a wireless receiving speaker according to a first embodiment of the present invention.
Figure 4B:
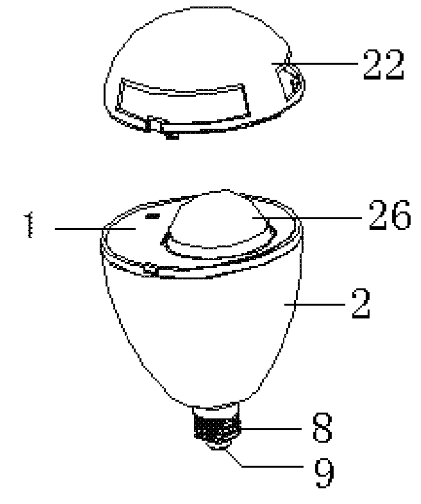

FIGS. 4A and 4B are schematic diagrams of the structure and dissection the outer cover 22 as shown in FIG. 2, and is a structure diagram of the first embodiment. The light source 26 is mounted in the inner of the outer cover 22, and at least one portion of the light emitting part of the light source 26 projects from the outer side of the face cover 1 and the loudspeaker net 7, for facilitating user's mounting and detaching of the light source 26 as desired. The outer cover 22 is a hemisphere, and the side surface of the hemisphere is provided with a square light transmission hole, capable of implementing better light transmission effect.

Figure 5A:
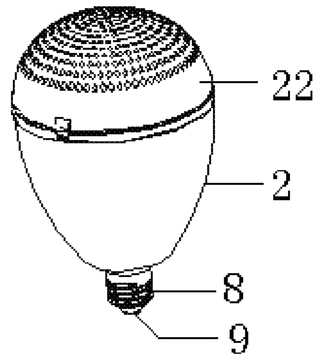
FIGS. 5A and 5B are schematic diagrams of a wireless receiving speaker according to a second embodiment of the present invention.
Figure 5B:
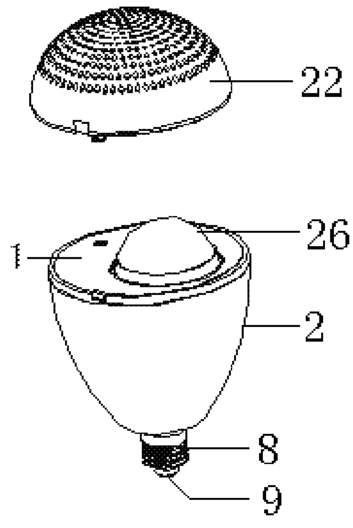

FIGS. 5A and 5B are schematic diagrams of the structure and dissection the outer cover 22 according to the second embodiment. The outer cover 22 is a hemisphere and the hemisphere is provided with a plurality of through holes capable of achieving a better light transmission effect.

According to this embodiment, the outer cover 22 can be wedged or pivoted with the bottom cover 2. Using such engagement mode, the outer cover is easily detached from the main body of the speaker, facilitating user's mounting and detachment of the light source 26 as desired. In other embodiments of the present invention, the outer cover 22 and the bottom cover 2 may use an engagement mode such as magnets, screws, or lockers.

A central processor is integrated on the control panel, and a microcomputer operating system is designed, capable of automatically controlling the sound control mode and the light control module. As an improved solution, a wireless router controlled by the central processor may also be mounted in the wireless receiving speaker. The wireless router may be integrated on the control panel, or may be independently deployed on the face cover 1 as a module, for implementing the function of the wireless router. This enables the user to use the same loop to implement the remote bridging function of the wireless router.

In practice, a plurality of wireless receiving speakers may be mounted, which are respectively provided with bulbs in different colors. The control panel turns on and turns off different bulbs randomly or in a specified order according to the design of the system program, thus producing flashing effects. Alternatively, automatic program design may also be implemented according to the music, allowing the light to change with the tempo of the music, and thus creating gorgeous light effects.

The internal structure can be obtained from FIG. 3. A power supply PCB 20, a shrapnel seat 3, a negative shrapnel 12, a spring 11, a positive spring 10, and a primary PCB 19, a loudspeaker press board 5, a loudspeaker 18, an upper EVA seal pad 16, a paring button 4, a lower EVA seal pad 17, a face over 1, and a loudspeaker net 7 are arranged by turn in the direction from the bottom cover 2 to the outer cover 22.

It can be seen from the dissection diagram that the power supply PCB 20 is fixed on the face cover 1 through PCB screws 13; the shrapnel seat 3 is fixedly connected to the power supply PCB 20 through the PCB screws 13; the primary PCB 19 is fixedly connected to the loudspeaker press board 5 through the PCB screws 13; a seal cover 6 and a wireless module 21 are arranged between the upper EVA seal pad 16 and the lower EVA seal pad 17, where the wireless module 21 is fixed on the face cover 1, and the wireless module may be a wireless module such a 2.4 GHz or 5.8 GHz, or WiFi, or Bluetooth module, or may be replaced with a wireless router. The face cover 1 is fixed on the bottom cover 2 through the fixing screws; the loudspeaker net 7 is arranged between the face cover 1 and the outer cover 22 and connected through loudspeaker screws 14. The upper EVA seal pad 16 is operable to seal the loudspeaker 18, and the lower EVA seal pad 17 is operable to seal the wireless module 21. The seal cover 6 abuts against the upper EVA seal pad 16, the loudspeaker 18, and the primary PCB 19. The paring button 4 is mounted on the face cover 1, used for paring for the wireless connection.

The corresponding components are made up of specific material. To be specific, the face cover 1, the bottom cover 2, and the shrapnel seat 3, the paring button 4, the loudspeaker press board 5, and the seal cover 6 are all made of high-temperature resistant and fire-proof plastic material, capable of resisting high temperatures and preventing fire. The loudspeaker net 7 is a high-temperature resistant PC net, with mesh diameter of 0.6 mm and single-sided adhesive. The metal screw cap 8 is made of aluminum material, with threads on the surface and an opening at the bottom. The metal press stud 9 is made of nickel coated material, with a round head at the upper end, where diameter of the round header is 9.6 mm. The positive shrapnel 10 and the negative shrapnel 12 are both stainless steel plate with thickness of 0.2 mm. The spring 11 is made by electro nickel plating. The PCB screws 13, the loudspeaker screws 14, and the fixing screws 15 are made by black zinc plating on self-tapping threads. The upper EVA seal pad 16 and the lower EVA seal pad are both made of fire-proof material, with single-sided adhesive. The outer cover 22 is made of PC transparent material. The light source 26 is an LED lamp or an energy saving lamp, preferably an energy-saving and LED lamp with the diagram smaller than 60 mm and total length smaller than 118 mm.

In the schematic diagram of a wireless transmitting set illustrated in FIG. 1, the set body includes an upper plastic cover 24 and a lower plastic cover 25. The support bracket 23 is embedded in the upper plastic cover. The lower plastic cover is externally provided with a light transmission element (without a reference sign) for remote control of reception. The wireless transmitting module may use a transmit frequency of 2.4 GHz or 5.8 GHz, or use WiFi, Bluetooth, or other wireless transmission modes. The wireless speaker system further includes a remote controller collaborated with the wireless transmitting set.

The wireless receiving speaker may be mounted on the ceiling, wall, or hidden place in the kitchen, living room, bedroom, bathroom or even bar, and restaurant. In addition, it may also be mounted on the table or floor lamp, or transportation means such as trains and planes, for providing beautiful music. In the embodiments of the present invention, one wireless transmitting set is capable of controlling one to eight wireless receiving speakers.

Data is transmitted between the wireless transmitting set and the wireless receiving speaker in wireless mode so that the user may freely control the speaker during use of the speaker, not subject to the impact of geographic locations. For example, the wireless transmitting set and the wireless receiving speaker use the wireless transmitting and receiving modules with a frequency of 2.4 GHz or 5.8 GHz, and in addition the wireless transmission and reception use a dynamic frequency analysis algorithm, a continuous scanning and searching mode plus a complex adaptation frequency selection algorithm, to rapidly change the frequency to prevent interference within the frequency band, implement seamless switching, enhance the anti-interference ability, recover the lost data relying on the complex forward error correction, and use the data packet retransmission protocol to ensure continuous high-definition audio playing. Meanwhile, the radio frequency (RF) power implements the dynamic power control algorithm, and automatically adjusts the RF transmit power to achieve the object of saving energy and reducing interference to adapt to the complex working environment. The wireless transmitting set and the wireless receiving speaker use the wireless transmitting and receiving modules with a frequency of 2.4 GHz or 5.8 GHz, having more powerful anti-interference ability, implementing a transmission distance as long as 30 meters indoors and 50 to 100 meters outdoors, or even farther. This better achieves user's no-obstruction reception of the audio signals transmitted by the receiving set in different regions of a user home. When a user moves from one room to another, the user can be freely handed over, and in addition, audio playing in one speaker in one room is transferred to the speaker in another room, implementing continuous playing of the music and continuous working of the illumination environment. Further, the wireless transmitting set is also provided with a long-distance remote controller, enabling the user to switch on or off the light and speaker as desired without moving the body, and switch the status of the songs, for example, up and down song selection, fast forward and rewind, pause play, and volume control.

In addition, as an improvement, the wireless transmitting module and the concept of the wireless transmission and operation are not only applied to a wireless receiving speaker integrating functions of the illumination and speaker provided in the embodiments of the present invention, but also applied to various bulbs, including a floor lamp, a table lamp, a ceiling lamp, and a bulb, and applied to various playing devices, such as a loudspeaker, a microphone, and a player. Further, the existing WiFi technology may also be used to implement control of the wireless router, providing functions of the modernized wireless illuminator, and wireless player.

In other embodiments of the present invention, the external electronic element may also be a wireless router. The wireless router is provided with a housing provided with a universal standard screw holder. The housing is engaged with the mounting bracket of the inner mounting sleeve through the standard screw holder. In this case, the light control module on the control panel is replaced by a wireless router control module and the wireless router control module controls working of the wireless router so that the user can use the same loop to implement the remote bridging function of the wireless router.

In other embodiments of the present invention, the external electronic element may also be a camera. The camera is provided with a housing provided with a universal standard screw holder. The housing is engaged with the mounting bracket of the inner mounting sleeve 27 through the standard screw holder. In this case, the light control module on the control panel is replaced by a camera control module and the camera control module controls working of the camera. The outer cover 22 is made of transparent material. In this embodiment, the control panel is provided with a detecting module. When detecting that the camera is abnormal, the detecting module sends signals to the sound control module through the control panel, thereby producing a specific sound for the purpose of alarming. The camera implements the monitoring and alarming functions. In addition, if the camera is modified to a projector optomechanical module, the function of picture, text or event video transmission function may be implemented.

In other embodiments of the present invention, the external electronic element may also be a projector. The projectors provided with a housing provided with a universal standard screw holder. The housing is engaged with the mounting bracket of the inner mounting sleeve 27 through the standard screw holder. In this case, the light control module on the control panel is replaced by a projection control module and the camera control module controls working of the projector. The outer cover 22 is made of transparent material.

In other embodiments of the present invention, the wireless receiving speaker further includes a built-in apparatus. The built-in apparatus includes a light source, a wireless router, a camera, a projector, or any combination of thereof. In this case, the control panel further includes a built-in apparatus control module, operable to control one or multiple built-in apparatuses.

In addition, as improvement to the present invention, a solar energy system may also be arranged on the wireless receiving speaker, where a solar cell panel is provided, for collecting solar energy. The collected solar energy is converted into electric energy and then the wireless receiving speaker is charged using the electric energy. In this way, the current trend of environment friendliness and energy conservation is accommodated.

In other embodiments of the present invention, devices such as a mobile phone or a computer may also be used as a wireless transmitting set for controlling the wireless speaker.

It should be noted that the above embodiments are described for illustration purpose only. The technical solutions of the present invention are not limited thereto. Although the present invention is described in detail by referring to the exemplary embodiments, those skilled in the art should understand that various modifications to the technical solution disclosed in the above embodiments or equivalent replacements for parts of technical features contained therein can be made according to the embodiments of the present invention. Such modifications and equivalent replacements fall into the principle and protection scope of the invention.

What is claimed is:

1. A wireless speaker, comprising an outer main body and an inner structure, wherein the outer main body comprises a bottom cover with a front-end opening, a metal screw cap and a metal press stub fixed at the rear end of the bottom cover and connected by turns, and a face cover arranged on the end with the opening of the bottom cover, a loudspeaker net, and a detachable outer cover;

wherein the inner structure comprises a power supply circuit, a wireless receiving apparatus, a control panel, a speaker apparatus, and a detachable external electronic element, wherein the power supply circuit is configured to supply power to the internal structure, the radio receiving apparatus is configured to receive wireless audio digital signals and transmit the received signals after digital-to-analog conversion on the control panel to the external electronic element and the speaker apparatus;

wherein the control panel comprises a processor, a sound control module and an external electronic element control module, wherein the external electronic element is connected to the external electronic element control module, the speaker apparatus is connected to the sound control module, and the processor and the sound control module are respectively connected to a light control module to control corresponding modules to work;

wherein the speaker apparatus is fixed in the bottom cover, the bottom cover is provided with an inner mounting sleeve, and the external electronic element is detachably mounted in the inner mounting sleeve and electrically connected to the power supply circuit and the control panel;

wherein the speaker apparatus comprises a loudspeaker, a loudspeaker press board, and the loudspeaker net wherein the loudspeaker is fixed through the loudspeaker press board on the face cover; the face cover is provided with an opening for housing the loudspeaker and transmitting sound generated by the loudspeaker; the loudspeaker net is mounted on the outer side of the face cover, and is provided with a through hole arranged correspondingly to the inner mounting sleeve of the face cover; the through hole has a diameter larger than a diameter of the inner mounting sleeve of the face cover, and is configured to mount the external electronic element in the inner mounting sleeve of the face cover; the external electronic element is provided with a universal standard screw holder; the inner mounting sleeve is internally provided with a mounting bracket collaborating and electrically connected to the standard screw holder of the electronic element, so that the external electronic element is electrically connected to the power supply circuit and the control panel.

2. The wireless speaker according to claim 1, wherein the external electronic element is a light source, and at least one portion of the light emitting part of the light source projects from the outer side of the face cover.

3. The wireless speaker according to claim 2, wherein the light source is an LED lamp or an energy-saving lamp.

4. The wireless speaker according to claim 1, wherein the external electronic element is a wireless router or a camera or a projector, wherein the wireless router or the camera or the projector is electrically mounted in a mounting bracket of the inner mounting sleeve through an outer housing having a standard screw holder.

5. The wireless speaker according to claim 1, wherein the wireless receiving speaker further comprises a built-in apparatus, wherein the built-in apparatus comprises a light source or a wireless router or a camera, or a projector or any combination thereof, and the control panel further comprises a built-in apparatus control module, operable to control the built-in apparatus.

6. A wireless speaker system, comprising a wireless speaker and a wireless transmitting set;

wherein the wireless speaker comprises an outer main body and an inner structure, wherein the outer main body comprises a bottom cover with a front-end opening, a metal screw cap and a metal press stub fixed at the rear end of the bottom cover and connected by turns, and a face cover arranged on the end with the opening of the bottom cover, a loudspeaker net, and a detachable outer cover;

wherein the inner structure comprises a power supply circuit, a wireless receiving apparatus, a control panel, a speaker apparatus, and a detachable external electronic element, wherein the power supply circuit is configured to supply power to the internal structure, the radio receiving apparatus is configured to receive wireless audio digital signals and transmit the received signals after digital-to-analog conversion on the control panel to the external electronic element and the speaker apparatus, wherein the control panel comprises a processor, a sound control module and an external electronic element control module, wherein the external electronic element is connected to the external electronic element control module, the speaker apparatus is connected to the sound control module, and the processor and the sound control module are respectively connected to a light control module to control corresponding modules to work;

the speaker apparatus is fixed in the bottom cover, the bottom cover is provided with an inner mounting sleeve, and the external electronic element is detachably mounted in the inner mounting sleeve and electrically connected to the power supply circuit and the control panel;

wherein the speaker apparatus comprises a loudspeaker, a loudspeaker press board, and the loudspeaker net wherein the loudspeaker is fixed through the loudspeaker press board on the face cover; the face cover is provided with an opening for housing the loudspeaker and transmitting sound generated by the loudspeaker; the loudspeaker net is mounted on the outer side of the face cover, and is provided with a through hole arranged correspondingly to the inner mounting sleeve of the face cover; the through hole has a diameter larger than a diameter of the inner mounting sleeve of the face cover, and is configured to mount the external electronic element in the inner mounting sleeve of the face cover; the external electronic element is provided with a universal standard screw holder; the inner mounting sleeve is internally provided with a mounting bracket collaborating and electrically connected to the standard screw holder of the electronic element, so that the external electronic element is electrically connected to the power supply circuit and the control panel;

wherein the wireless transmitting set is configured to obtain audio data from an external electronic device, and transmit the audio data in the form of wireless audio digital signals; wherein the wireless transmitting set comprises a set body, a wireless transmitting module set in the set body, and a PCBA control board for controlling the wireless transmitting module.

7. The wireless speaker system according to claim 6, wherein the set body comprises a plastic upper cover and a lower plastic cover that are mutually contacted; wherein the plastic upper cover is provided with a support bracket for housing an audio playing device, and the lower plastic cover is externally provided with a light transmission element for remote control of reception.

8. The wireless speaker system according to claim 7, further comprising a remote controller collaborated with the wireless transmitting set.

9. The wireless speaker system according to claim 6, wherein the external electronic element is a light source, and at least one portion of the light emitting part of the light source projects from the outer side of the face cover.

10. The wireless speaker system according to claim 9, wherein the light source is an LED lamp or an energy-saving lamp.

11. The wireless speaker system according to claim 6, wherein the external electronic element is a wireless router or a camera or a projector, wherein the wireless router or the camera or the projector is electrically mounted in the mounting bracket of the inner mounting sleeve through an outer housing having a standard screw holder.

12. The wireless speaker system according to claim 6, wherein the wireless receiving speaker further comprises a built-in apparatus, wherein the built-in apparatus comprises a light source or a wireless router or a camera, or a projector or any combination thereof, and the control panel further comprises a built-in apparatus control module, operable to control the built-in apparatus.

13. The wireless speaker according to claim 1, wherein the power supply circuit, a shrapnel seat, a negative shrapnel, a spring, a positive spring, the control panel, the loudspeaker press board, the loudspeaker, an upper EVA seal pad, a paring button, a lower EVA seal pad, the face over and the loudspeaker net are arranged by turn in a direction from the bottom cover to the detachable outer cover.

14. The wireless speaker according to claim 13, wherein the power supply circuit is fixed on the face cover through first PCB screws; the shrapnel seat is fixedly connected to the power supply circuit through second PCB screws; the control panel is fixedly connected to the loudspeaker press board through third PCB screws; a seal cover and a wireless module are arranged between the upper EVA seal pad and the lower EVA seal pad, wherein the wireless module is fixed on the face cover; the face cover is fixed on the bottom cover through fixing screws; the loudspeaker net is arranged between the face cover and the outer cover and connected through loudspeaker screws; the upper EVA seal pad is configured to seal the loudspeaker, and the lower EVA seal pad is configured to seal the wireless module; the seal cover abuts against the upper EVA seal pad, the loudspeaker and the control panel; and the paring button is mounted on the face cover, and is configured to pari for a wireless connection.

15. The wireless speaker according to claim 14, wherein the wireless module comprises one of a wireless router and a wireless module with one of 2.4 GHz, 5.8 GHz, WiFi and Bluetooth module.

16. The wireless speaker according to claim 13, wherein the face cover, the bottom cover, the shrapnel seat, the paring button, the loudspeaker press board and the seal cover are all made of high-temperature resistant and fire-proof plastic material.

17. The wireless speaker system according to claim 6, wherein the power supply circuit, a shrapnel seat, a negative shrapnel, a spring, a positive spring, the control panel, the loudspeaker press board, the loudspeaker, an upper EVA seal pad, a paring button, a lower EVA seal pad, the face over and the loudspeaker net are arranged by turn in a direction from the bottom cover to the detachable outer cover.

18. The wireless speaker system according to claim 17, wherein the power supply circuit is fixed on the face cover through first PCB screws; the shrapnel seat is fixedly connected to the power supply circuit through second PCB screws; the control panel is fixedly connected to the loudspeaker press board through third PCB screws; a seal cover and a wireless module are arranged between the upper EVA seal pad and the lower EVA seal pad, wherein the wireless module is fixed on the face cover; the face cover is fixed on the bottom cover through fixing screws; the loudspeaker net is arranged between the face cover and the outer cover and connected through loudspeaker screws; the upper EVA seal pad is configured to seal the loudspeaker, and the lower EVA seal pad is configured to seal the wireless module; the seal cover abuts against the upper EVA seal pad, the loudspeaker and the control panel; and the paring button is mounted on the face cover, and is configured to pari for a wireless connection.

19. The wireless speaker system according to claim 18, wherein the wireless module comprises one of a wireless router and a wireless module with one of 2.4 GHz, 5.8 GHz, WiFi and Bluetooth module.

20. The wireless speaker system according to claim 17, wherein the face cover, the bottom cover, the shrapnel seat, the paring button, the loudspeaker press board and the seal cover are all made of high-temperature resistant and fire-proof plastic material.

* * * * *